No. 611,194. Patented Sept. 20, 1898.
C. P. BIRNER.
HOUSING FOR SCREW THREADED CYCLE PARTS.
(Application filed June 7, 1897.)
(No Model.)
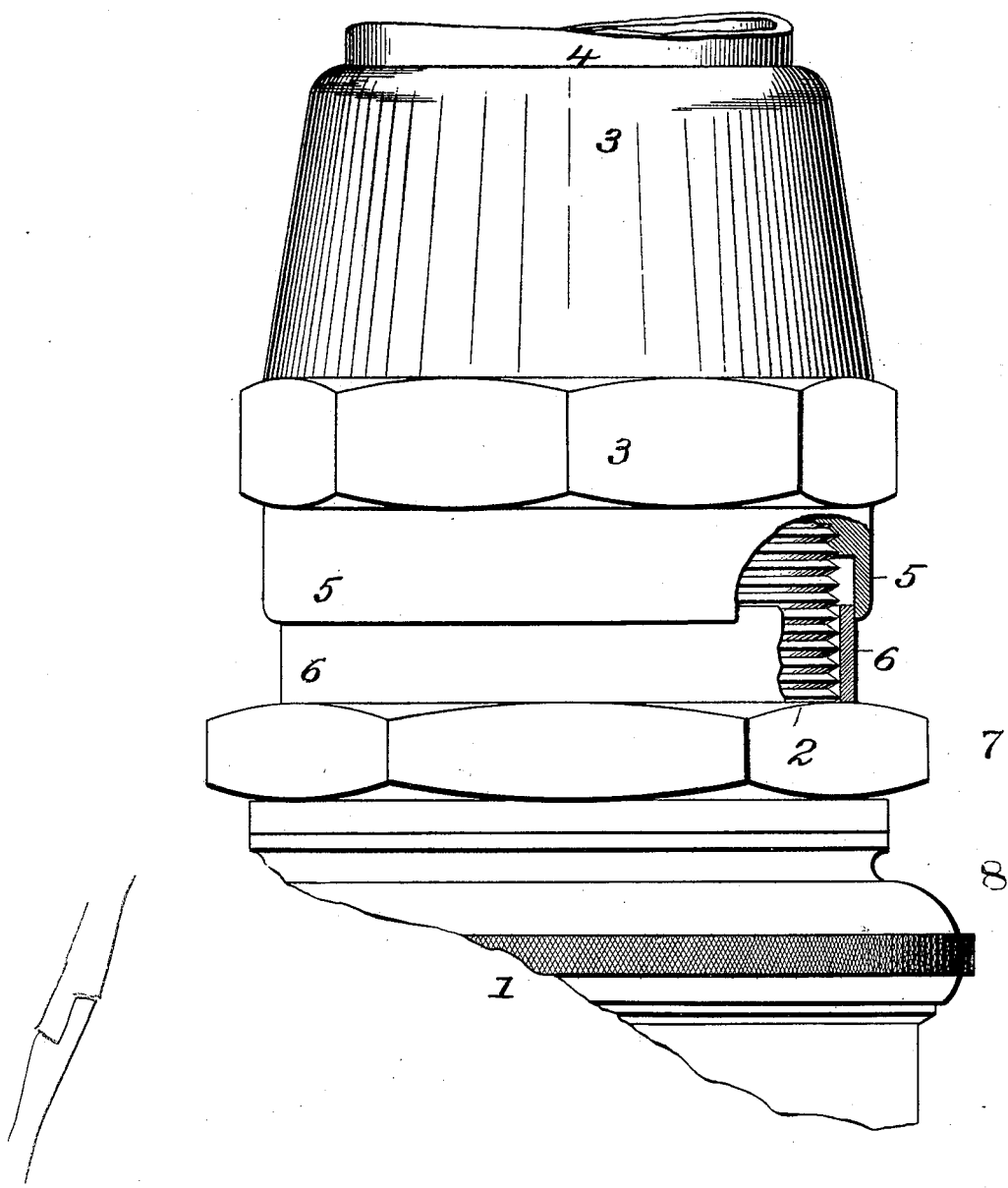
Attest:
James Lavallui
M. H. Holmes
Inventor:
Charles P. Birner,
by Robert Burns Atty.

UNITED STATES PATENT OFFICE.

CHARLES P. BIRNER, OF CHICAGO, ILLINOIS, ASSIGNOR TO THE MONARCH CYCLE MANUFACTURING COMPANY, OF SAME PLACE.

HOUSING FOR SCREW-THREADED CYCLE PARTS.

SPECIFICATION forming part of Letters Patent No. 611,194, dated September 20, 1898.

Application filed June 7, 1897. Serial No. 639,767. (No model.)

*To all whom it may concern:*

Be it known that I, CHARLES P. BIRNER, a citizen of the United States, residing at Chicago, in the county of Cook and State of Illinois, have invented certain new and useful Improvements in Housings for Screw-Threaded Cycle Parts; and I do declare the following to be a full, clear, and exact description of the same, reference being had to the accompanying drawing, forming a part of this specification.

The present invention relates to means for housing the exposed screw-threaded portions of a cycle, so as to protect the same from dust, &c., and at the same time afford a more finished and ornamental appearance to the cycle, the object of the present improvement being to provide a simple and effective construction and arrangement of parts in connection with a cap-nut of a cycle whereby the screw-threaded necks engaged by such cap-nuts are housed and protected in a very simple and perfect manner regardless of the relative adjustment of the parts.

I attain such object by the construction and arrangement of parts illustrated in the accompanying drawing, which represents my invention applied to the steering portion of a bicycle, with parts in side elevation and parts in axial section.

Referring to the drawing, 1 represents the upper portion of the steering post or shell of a safety-bicycle; 2, the upper end of the steering-stem of the steering-head of the front bicycle-wheel, which stem has the usual journal-bearings in said post or shell 1, the upper and projecting end of said fork-stem 2 being screw-threaded, as shown, to receive the cap-nut 3, by which the stem of the handle-bars is clamped in place, as well as to receive the usual nut 7, by which the adjustment of the upper ball-cup 8 is effected.

In the present invention the cap-nut 3 is formed with an annular flange or skirt 5, that forms an interior recess or chamber adapted to receive the loose flat ring or collar 6, that surrounds the screw-threaded end of the stem 2 to inclose and protect the same, such inclosing ring or collar being adapted to have free endwise movement in the recess of the cap-nut 3 to permit of the adjustment of the same upon the screw-threaded end of the stem 2. The loose nature of the inclosing ring or collar 6 is a material feature of the present invention in that it admits of the usual independent adjustments of the nuts 3 and 7 without an uncovering of the screw-threaded portion of the fork-stem that lies between said nuts.

The present improvement is adapted for general use upon various parts of a bicycle where a cap-nut is employed upon an externally-screw-threaded and exposed end of a shaft or sleeve, and the scope of my present invention embraces any such application.

Having thus fully described my said invention, what I claim as new, and desire to secure by Letters Patent, is—

1. A housing for screw-threaded cycle parts, comprising in combination, the steering-fork stem screw-threaded at its upper end to receive the usual nut to effect an adjustment of the upper ball-cup of the bearing, a cap-nut screwing onto the upper end of said stem to clamp the handle-bar in place, a loose ring or collar inclosing and protecting the screw-threads of the fork-stem, and means upon such cap-nut for vertically guiding said ring or collar in an adjustment of the parts, substantially as set forth.

2. A housing for screw-threaded cycle parts, comprising in combination, the steering-fork stem screw-threaded at its upper end to receive the usual nut to effect an adjustment of the upper ball-cup of the bearing, a cap-nut screwing onto the upper end of said stem to clamp the handle-bar in place, a loose ring or collar inclosing and protecting the screw-threads of the fork-stem, and means upon such cap-nut for vertically guiding said ring or collar in an adjustment of the parts, the same consisting of a pendent annular skirt on the cap-nut, inside of which said ring or collar slides, substantially as set forth.

In testimony whereof witness my hand this 2d day of June, 1897.

CHARLES P. BIRNER.

Witnesses:
ROBERT BURNS,
JAMES LAVALLUI.